United States Patent
Wang et al.

(10) Patent No.: US 11,700,101 B2
(45) Date of Patent: Jul. 11, 2023

(54) INFORMATION TRANSMISSION METHOD, TERMINAL DEVICE, AND NETWORK DEVICE

(71) Applicant: HUAWEI TECHNOLOGIES CO., LTD., Guangdong (CN)

(72) Inventors: Jianguo Wang, Beijing (CN); Jianqin Liu, Beijing (CN); Chuanfeng He, Shenzhen (CN); Xu Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/876,248

(22) Filed: Jul. 28, 2022

(65) Prior Publication Data

US 2022/0368501 A1 Nov. 17, 2022

Related U.S. Application Data

(63) Continuation of application No. 16/715,881, filed on Dec. 16, 2019, now abandoned, which is a (Continued)

(30) Foreign Application Priority Data

Jun. 16, 2017 (CN) .......................... 201710461711.2

(51) Int. Cl.
*H04L 5/00* (2006.01)
*H04W 72/12* (2023.01)
(Continued)

(52) U.S. Cl.
CPC .......... *H04L 5/0053* (2013.01); *H04L 5/0007* (2013.01); *H04W 72/12* (2013.01);
(Continued)

(58) Field of Classification Search
CPC ............. H04W 72/04; H04W 72/0406; H04W 72/1278; H04W 72/12; H04W 72/20; H04L 5/0053; H04L 5/0007
See application file for complete search history.

(56) References Cited

U.S. PATENT DOCUMENTS 9,930,648 B2 * 3/2018 Frenne .................. H04L 5/0053
2011/0255486 A1 * 10/2011 Luo ........................ H04W 48/12
370/329

(Continued)

FOREIGN PATENT DOCUMENTS

CN 102420685 A 4/2012
CN 102598795 A 7/2012
(Continued)

OTHER PUBLICATIONS

Office Action in Chinese Appln. No. 201710461711.2, dated Feb. 28, 2023, 8 pages.
(Continued)

*Primary Examiner* — Raj Jain
(74) *Attorney, Agent, or Firm* — Fish & Richardson P.C.

(57) ABSTRACT

One example method includes receiving configuration information of a control channel resource set, where the configuration information indicates a quantity of time-frequency resource blocks of the control channel resource set and an offset from a frequency domain center location of a synchronization signal block to a frequency domain center location of the control channel resource set, the synchronization signal block includes broadcast information and a synchronization signal, and the broadcast information includes the configuration information. The control channel resource set is determined based on the quantity of time-frequency resource blocks and the offset, and control information is received within the control channel resource set.

20 Claims, 11 Drawing Sheets

Related U.S. Application Data continuation of application No. PCT/CN2018/091823, filed on Jun. 19, 2018.

(51) Int. Cl.
*H04W 72/20* (2023.01)
*H04W 72/044* (2023.01)
*H04L 27/26* (2006.01)

(52) U.S. Cl.
CPC ........... *H04W 72/20* (2023.01); *H04L 5/0048* (2013.01); *H04L 27/2602* (2013.01); *H04W 72/044* (2013.01)

(56) References Cited

U.S. PATENT DOCUMENTS

| | | | | |
|---|---|---|---|---|
| 2012/0281567 | A1* | 11/2012 | Gao | H04L 5/0057 370/252 |
| 2013/0242882 | A1 | 9/2013 | Blankenship et al. | |
| 2014/0105165 | A1* | 4/2014 | Dinan | H04W 72/54 370/329 |
| 2016/0157254 | A1* | 6/2016 | Novlan | H04W 72/02 370/329 |
| 2018/0049164 | A1* | 2/2018 | Wu | H04W 72/12 |
| 2019/0123864 | A1* | 4/2019 | Zhang | H04W 16/28 |
| 2019/0223204 | A1* | 7/2019 | Kim | H04L 5/0053 |
| 2020/0120659 | A1* | 4/2020 | Wang | H04L 5/0094 |
| 2022/0368501 | A1* | 11/2022 | Wang | H04L 5/0094 |

FOREIGN PATENT DOCUMENTS

| | | |
|---|---|---|
| CN | 102804625 | 11/2012 |
| CN | 103096493 | 5/2013 |
| CN | 104025495 A | 9/2014 |
| CN | 105099639 | 11/2015 |
| JP | 2015501609 | 1/2015 |
| JP | 2020509662 | 3/2020 |
| WO | 2018143397 | 8/2018 |

OTHER PUBLICATIONS

Ericsson, "On REG Bundle and CCE Size for NR-PDCCH," 3GPP TSG-RAN WG1 Meeting #89, R1-1709066, Hangzhou, China, May 15-19, 2017, 7 pages.

Ericsson, "Overview of DL Control Channel Design," 3GPP TSG-RAN WG1 Meeting #89, R1-1709062, Hangzhou, China, May 15-19, 2017, 10 pages.

Extended European Search Report issued in European Application No. 18818933.6 dated Apr. 29, 2020, 9 pages.

Huawei et al., "CCE-to-REG Mapping," 3GPP TSG RAN WG1 Meeting #89, R1-1706946, Hangzhou, China, May 15-19, 2017, 7 pages.

Huawei et al., "Configuration of control resource set," 3GPP TSG RAN WG1 Meeting #89, R1-1706943, Hangzhou, China, May 15-19, 2017, 4 pages.

Office Action issued in Japanese Application No. 2019-569756 dated Mar. 9, 2021, 9 pages (with English translation).

PCT International Search Report and Written Opinion issued in International Application No. PCT/CN2018/091823 dated Sep. 6, 2018, 17 pages (with English translation).

* cited by examiner

Used for a DMRS

Used for DCI

INFORMATION TRANSMISSION METHOD, TERMINAL DEVICE, AND NETWORK DEVICE

CROSS-REFERENCE TO RELATED APPLICATIONS

This application is a continuation of U.S. patent application Ser. No. 16/715,881, filed on Dec. 16, 2019, which is a continuation of International Application No. PCT/CN2018/091823, filed on Jun. 19, 2018, which claims priority to Chinese Patent Application No. 201710461711.2, filed on Jun. 16, 2017. All of the afore-mentioned patent applications are hereby incorporated by reference in their entireties.

TECHNICAL FIELD

This application relates to the communications field, and more specifically, to an information transmission method, a terminal device, and a network device in the communications field.

BACKGROUND

A long term evolution (long term evolution, LTE) system standard formulated by the 3rd generation partnership project (3rd generation partnership project, 3GPP) is considered as the 4th generation wireless access system standard, and LTE systems are widely deployed within a range of a frequency band that is less than 6 GHz. However, based on distribution of dividable spectrums, it is very likely that a carrier frequency of the 5th generation wireless access system is higher than that of the 4th generation wireless access system, and a to-be-selected carrier frequency range includes 30 GHz, 60 GHz, and the like.

When a terminal device initially accesses a system, a synchronization signal block (synchronization signal block, SS block) needs to be detected, and the synchronization signal block includes a synchronization signal and a broadcast channel. The terminal device receives broadcast information that is carried on the broadcast channel, to obtain a time-frequency resource of a control channel. In the LTE system, the broadcast information carries system bandwidth information, and the system bandwidth information is used to indicate a frequency domain resource of a control channel resource set. A new-generation wireless communications system developed for a 5th generation (5-Generation, 5G) mobile communications technology is referred to as a new radio (new radio, NR). The NR supports a larger bandwidth and more services. In the 5G system, the system bandwidth information is not included in the broadcast information, and therefore, user equipment cannot obtain inbound bandwidth information. In addition, it is proposed in a related technical solution that the control channel resource set indicated by the broadcast information occupies consecutive frequency domain resources.

SUMMARY

This application provides an information transmission method, a terminal device, and a network device. Configuration information of a control channel resource set is used to indicate a time-frequency resource of a control channel, the time-frequency resource of the control channel is inconsecutive and includes a plurality of time-frequency resource blocks, and there is an interval between the plurality of time-frequency resource blocks. When receiving control information on the control channel, the terminal device may obtain a better frequency diversity gain, to improve transmission efficiency.

According to a first aspect, an information transmission method is provided. The method includes: receiving, by a terminal device, configuration information of a control channel resource set, where the configuration information is used to indicate the control channel resource set, and the configuration information includes at least one of a quantity of time-frequency resource blocks of a control channel and an interval between two adjacent time-frequency resource blocks; determining, by the terminal device, a time-frequency resource of the control channel based on the configuration information; and receiving, by the terminal device, control information on the time-frequency resource of the control channel.

In the information transmission method provided in the first aspect, the configuration information of the control channel resource set is used to indicate the time-frequency resource of the control channel, the time-frequency resource of the control channel is inconsecutive and includes a plurality of time-frequency resource blocks, and there is an interval between the plurality of time-frequency resource blocks. Therefore, even if a relatively large quantity of signal paths are generated in a channel environment, the terminal device may obtain a better frequency diversity gain when receiving the control information on the control channel, to improve transmission efficiency.

In a possible implementation of the first aspect, the time-frequency resource block includes at least one resource element group REG set, and the REG set includes a plurality of REGs that are consecutive or adjacent in time domain or in frequency domain.

In a possible implementation of the first aspect, the interval between two adjacent time-frequency resource blocks includes, in frequency domain, a frequency domain resource corresponding to an integer quantity of REGs or a frequency domain resource corresponding to an integer quantity of REG sets.

In a possible implementation of the first aspect, offset that is of a frequency domain center location of the resource set and that is relative to a frequency domain center location of a synchronization signal block is predefined, or is indicated by the configuration information; and the synchronization signal block includes the configuration information.

In a possible implementation of the first aspect, at least one of the quantity of time-frequency resource blocks and the interval between two adjacent time-frequency resource blocks is predefined.

In a possible implementation of the first aspect, at least one of a quantity of REG sets included in the time-frequency resource block and a quantity of REGs included in the REG set is predefined, or is indicated by the configuration information.

In a possible implementation of the first aspect, an offset that is from the frequency domain center location of the synchronization signal block to the frequency domain center location of the resource set is determined based on a cell identity in the synchronization signal block.

According to a second aspect, an information transmission method is provided. The method includes: generating, by a network device, configuration information of a control channel resource set, where the configuration information is used to indicate the control channel resource set, and the configuration information includes at least one of a quantity of time-frequency resource blocks of a control channel and an interval between two adjacent time-frequency resource blocks; and sending, by the network device, the configuration information.

In the information transmission method provided in the second aspect, the network device uses the configuration information of the control channel resource set to indicate the time-frequency resource of the control channel, the time-frequency resource of the control channel is inconsecutive and includes a plurality of time-frequency resource blocks, and there is an interval between the plurality of time-frequency resource blocks. Therefore, even if a relatively large quantity of signal paths are generated in a channel environment, a terminal device may obtain a better frequency diversity gain when receiving the control information on the control channel, to improve transmission efficiency.

In a possible implementation of the second aspect, the time-frequency resource block includes at least one resource element group REG set, and the REG set includes a plurality of REGs that are consecutive or adjacent in time domain or in frequency domain.

In a possible implementation of the second aspect, the interval between two adjacent time-frequency resource blocks includes, in frequency domain, a frequency domain resource corresponding to an integer quantity of REGs or a frequency domain resource corresponding to an integer quantity of REG sets.

In a possible implementation of the second aspect, offset that is of a frequency domain center location of the resource set and that is relative to a frequency domain center location of a synchronization signal block is predefined, or is indicated by the configuration information; and the synchronization signal block includes the configuration information.

In a possible implementation of the second aspect, at least one of the quantity of time-frequency resource blocks and the interval between two adjacent time-frequency resource blocks is predefined.

In a possible implementation of the second aspect, at least one of a quantity of REG sets included in the time-frequency resource block and a quantity of REGs included in the REG set is predefined, or is indicated by the configuration information.

In a possible implementation of the second aspect, an offset that is from the frequency domain center location of the synchronization signal block to the frequency domain center location of the resource set is determined based on a cell identity in the synchronization signal block.

According to a third aspect, a terminal device is provided. The terminal device includes a processor, a memory, and a transceiver that are configured to support the terminal device in performing a corresponding function in the foregoing method. The processor, the memory, and the transceiver are connected. The memory stores instructions. The transceiver, driven by the processor, is configured to send or receive a specific signal. The processor is configured to invoke the instructions to implement the information transmission method in the first aspect and the various implementations of the first aspect.

According to a fourth aspect, a terminal device is provided. The terminal device includes a processing module, a storage module, and a transceiver module that are configured to support the terminal device in performing a function of the terminal device in any one of the first aspect or the possible implementations of the first aspect. The function may be implemented by hardware, or may be implemented by corresponding software executed by hardware. The hardware or software includes one or more modules corresponding to the function.

According to a fifth aspect, a network device is provided. The network device includes a processor, a memory, and a transceiver that are configured to support the network device in performing a corresponding function in the foregoing method. The processor, the memory, and the transceiver are connected. The memory stores instructions. The transceiver, driven by the processor, is configured to send or receive a specific signal. The processor is configured to invoke the instructions to implement the information transmission method in the second aspect and the various implementations of the second aspect.

According to a sixth aspect, a network device is provided. The network device includes a processing module, a storage module, and a transceiver module that are configured to support the network device in performing a function of the network device in any one of the second aspect or the possible implementations of the second aspect. The function may be implemented by hardware, or may be implemented by corresponding software executed by hardware. The hardware or software includes one or more modules corresponding to the function.

According to a seventh aspect, a communications system is provided. The communications system includes the terminal device provided in the third aspect or the fourth aspect, and the network device provided in the fifth aspect or the sixth aspect. The communications system may implement the information transmission method provided in the first aspect and the second aspect.

According to an eighth aspect, a computer readable storage medium is provided and configured to store a computer program. The computer program includes instructions used to perform the method in any one of the first aspect or the possible implementations of the first aspect.

According to a ninth aspect, a computer readable storage medium is provided and configured to store a computer program. The computer program includes instructions used to perform the method in any one of the second aspect or the possible implementations of the second aspect.

DESCRIPTION OF EMBODIMENTS

Figure 1:
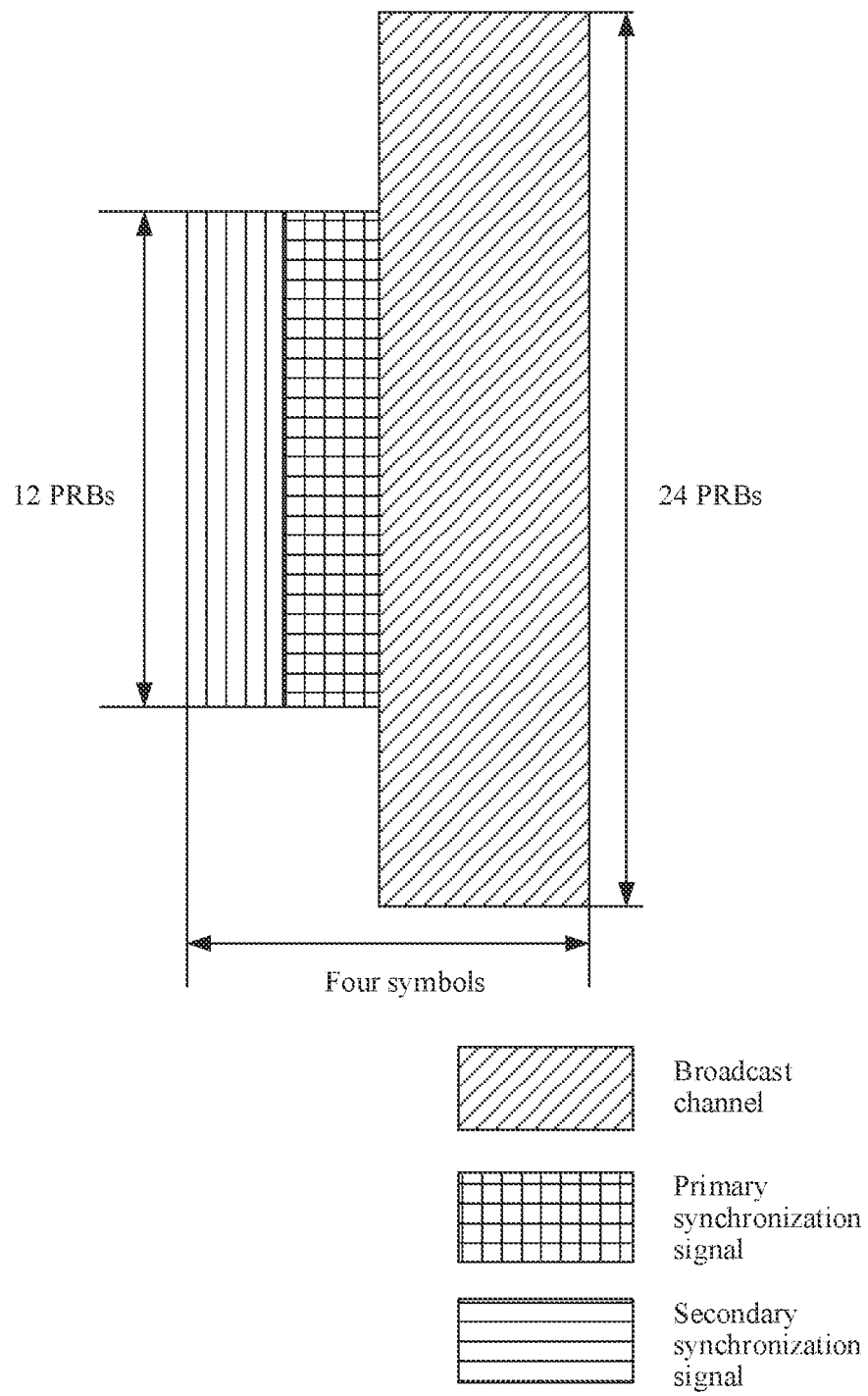
FIG. 1 is a schematic structural diagram of a synchronization signal block.

The following describes the technical solutions of this application with reference to accompanying drawings.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in the figures, both an application running on a computing device and the computing device may be components. One or more components may reside within a process and/or a thread of execution, and a component may be located on one computer and/or distributed between two or more computers. In addition, the components may be executed from various computer-readable media that store various data structures. For example, the components may communicate by using a local and/or remote process and based on a signal having one or more data packets (for example, data from two components interacting with another component in a local system, a distributed system, and/or across a network such as the Internet interacting with other systems by using the signal).

It should be understood that the technical solutions of this application may be applied to various communications systems, for example, an LTE/LTE-A system, an LTE/LTE-A frequency division duplex (frequency division duplex, FDD) system, an LTE/LTE-A time division duplex (time division duplex, TDD) system, a universal mobile telecommunication system (universal mobile telecommunication system, UMTS), a worldwide interoperability for microwave access (worldwide interoperability for microwave access, WiMAX) communications system, a public land mobile network (public land mobile network, PLMN) system, a device-to-device (device to device, D2D) network system or a machine-to-machine (machine to machine, M2M) network system, a wireless fidelity (wireless fidelity, Wi-Fi) system, a wireless local area network (wireless local area network, WLAN), and a future 5G communications system.

It should be further understood that, in the embodiments of this application, a terminal device may also be referred to as user equipment (user equipment, UE), a mobile station (mobile station, MS), a mobile terminal (mobile terminal), or the like. The terminal device may communicate with one or more core networks over a radio access network (radio access network, RAN). For example, the terminal device may include various handheld devices, vehicle-mounted devices, wearable devices, and computing devices that have a wireless communication function, or another processing device connected to a wireless modem. The terminal device may also include a subscriber unit, a cellular phone (cellular phone), a smartphone (smart phone), a wireless data card, a personal digital assistant (Personal Digital Assistant, PDA) computer, a tablet computer, a wireless modem (modem), a handset (handset), a laptop computer (laptop computer), a machine type communication (machine type communication, MTC) terminal, a station (station, STA) in a wireless local area network (wireless local area network, WLAN), and the like. The terminal device may be a cellular phone, a cordless telephone set, a session initiation protocol (Session Initiation Protocol, SIP) phone, a wireless local loop (wireless local loop, WLL) station, and a next-generation communications system, for example, a terminal device in a 5G network, or a terminal device in a future evolved public land mobile network (Public Land Mobile Network, PLMN). This is not limited in the embodiments of this application.

It should be further understood that a base station may also be referred to as a network-side device or an access network device. The network-side device may be a device that is configured to communicate with the terminal device. The network device may be an evolved NodeB (evolved Node B, eNB or eNodeB) in the LTE system, a gNB in an NR, an access point, a base station transceiver, a transmission reception point, and the like, or may be a vehicle-mounted device, a wearable device, a network device in a future 5G network, or a network-side device in a future evolved PLMN system. Fax example, the network-side device may be an access point (access point, AP) in a WLAN, or may be a base transceiver station (Base Transceiver Station, BTS) in a global system for mobile communications (global system for mobile communications, GSM) or code division multiple access (code division multiple access, CDMA). The network device may be an evolved NodeB (evolved NodeB, eNB or eNodeB) in the LTE system. Alternatively, the network device may be a NodeB (Node B) in the 3rd generation (3rd Generation, 3G) system. In addition, the network device may be a relay node, an access point, a vehicle-mounted device, a wearable device, a network device in a future 5G network, a network device in a future evolved PLMN network, or the like. This is not limited in the embodiments of this application. For ease of description, in all the embodiments of this application, the foregoing apparatuses that provide a wireless communication function for an MS are collectively referred to as a network device.

The following briefly describes the terms in the embodiments of this application.

A symbol includes but is not limited to an orthogonal frequency division multiplexing (orthogonal frequency division multiplexing, OFDM) symbol, a sparse code multiple access (sparse code multiple access, SCMA) symbol, a filtered orthogonal frequency division multiplexing (filtered orthogonal frequency division multiplexing, F-OFDM) symbol, a non-orthogonal multiple access (non-orthogonal multiple access, NOMA) symbol, and the like. This is not limited in the embodiments of this application.

A subframe is a time-frequency resource element that includes a time-frequency resource that occupies an entire system bandwidth in frequency domain and fixed duration in time domain, for example, 1 ms.

A slot refers to a basic time-frequency resource element that occupies seven consecutive symbols in time domain. This is not limited in the embodiments of this application.

A subcarrier width is a minimum granularity in frequency domain. For example, in the LTE system, a subcarrier width of one subcarrier is 15 kHz; and in the 5G system, one subcarrier width may be 15 kHz, 30 kHz, 60 kHz, or the like. This is not limited in the embodiments of this application.

A physical resource block (physical resource block, PRB) occupies P consecutive subcarriers in frequency domain and Q consecutive OFDM symbols in time domain, where P and Q are natural munchers greater than 1. For example, a physical resource block may occupy 12 consecutive subcarriers in frequency domain and seven consecutive OFDM symbols in time domain, where P=12 and Q=7. Alternatively, P=12 and Q=14. This is not limited in the embodiments of this application.

A resource element group (resource element group, REG) occupies P consecutive subcarriers in frequency domain and Q consecutive OFDM symbols in time domain, where P is a natural number greater than 1. For example, a resource element group may occupy 12 consecutive subcarriers in frequency domain and one OFDM symbol in time domain, where P=12 and Q=1. This is not limited in the embodiments of this application.

A control channel element (control channel element, CCE) corresponds to a plurality of resource element groups. One control channel element corresponds to a fixed quantity of resource element groups, for example, six resource element groups. This is not limited in the embodiments of this application.

When the terminal device initially accesses the system, a synchronization signal block needs to be detected. FIG. 1 is a structural schematic diagram of a synchronization signal block. It can be learned from FIG. 1 that the synchronization signal block includes a synchronization signal and a broadcast channel. The synchronization signal includes a primary synchronization signal (primary synchronization signal, PSS) and a secondary synchronization signal (secondary synchronization signal, SSS). The synchronization signal is sent in a format of a synchronization signal sequence, and different synchronization signal sequences correspond to different cell identities. The broadcast channel occupies 24 PRBs, the primary synchronization signal and the secondary synchronization signal occupy 12 PRBs, and the synchronization signal block occupies four symbol lengths in time domain. The terminal device receives broadcast information that is carried on the broadcast channel, to obtain a time-frequency resource of a control channel. The time-frequency resource of the control channel includes at least common search space. The common search space is a time-frequency resource on which the terminal device receives broadcast signaling in a serving cell. The broadcast signaling includes at least one type of control information for scheduling paging information and control information for indicating random access response information.

In the LTE system, the broadcast information carries system bandwidth information, and the system bandwidth information is used to indicate a frequency domain resource of a control channel resource set. For example, the broadcast information includes 3-bit information, and corresponds to {6, 15, 25, 50, 75, 100} physical resource blocks in a system bandwidth, or corresponds to {1.4 MHz, 3 MHz, 5 MHz, 10 MHz, 15 MHz, 20 MHz} bandwidth values.

Figure 2:
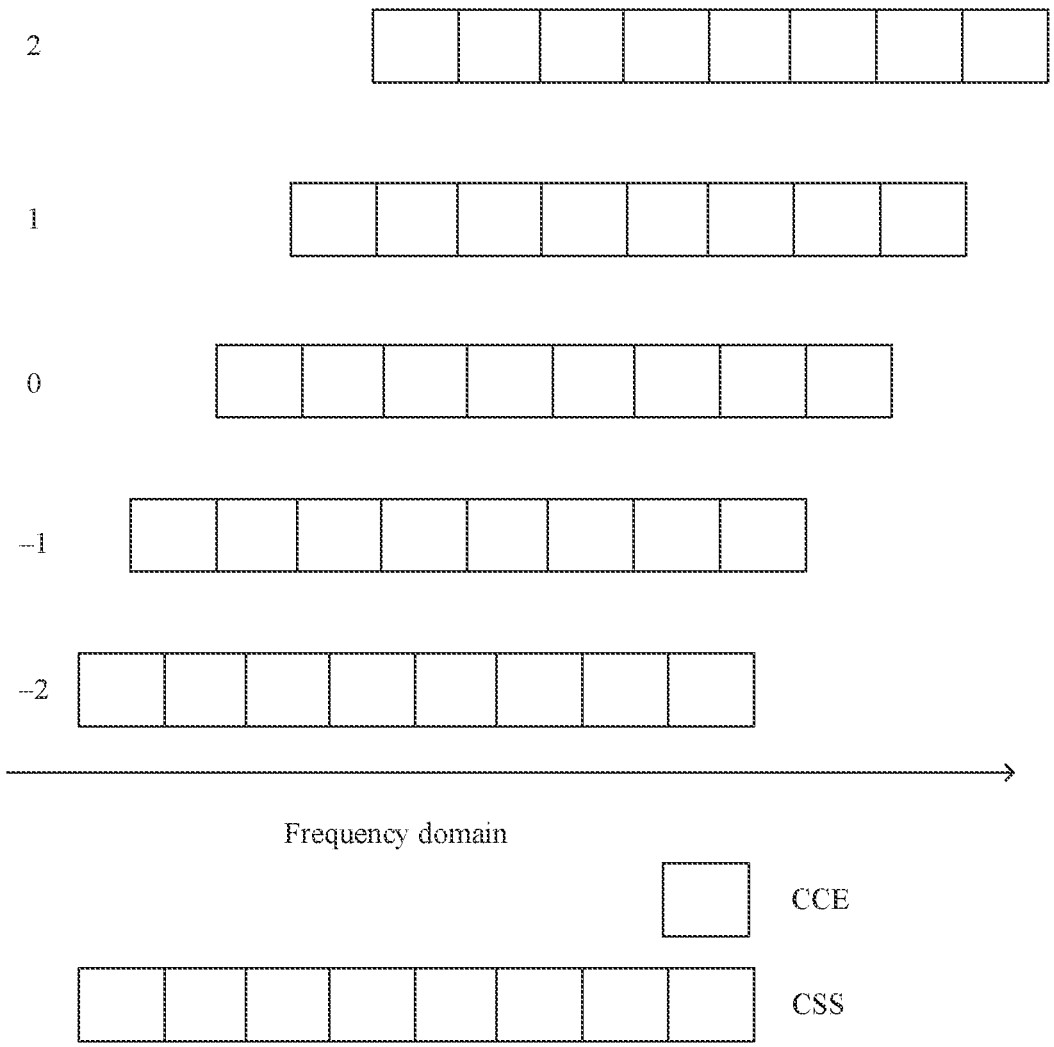
FIG. 2 is a schematic diagram of a time-frequency resource of common search space in the prior art.

In the 5G system, the system bandwidth information is not included in the broadcast information, and therefore, user equipment cannot obtain inbound bandwidth information. In addition, it is proposed in a related technical solution that the control channel resource set indicated by the broadcast information occupies consecutive frequency domain resources, as shown in FIG. 2. FIG. 2 is a schematic diagram of a time-frequency resource of common search space in the prior art. In FIG. 2, a horizontal axis is a frequency domain, and common search space (common search space, CSS) of each cell includes a plurality of CCEs, for example, eight CCEs. Each CCE includes six PRBs in frequency domain, and the control channel occupies one OFDM symbol in time domain. In FIG. 2, 2, 1, 0, −1 and −2 are offsets that from a center frequency of the broadcast information to frequency domain resources of control channels of different cells, where a positive value and a negative value represent offsets in opposite directions. It can be learned from FIG. 2 that, for one cell, a frequency domain resource occupied by a control channel is consecutive, to be specific, there is no interval between eight CCEs. In addition, as shown in FIG. 2, control channels of five different cells overlap partially in frequency domain. Therefore, control information is easily interfered by a neighboring cell. The control channel is consecutive in frequency domain. If a relatively large quantity of signal paths are generated in a channel environment, transmitted control information does not easily obtain a frequency diversity gain. Moreover, in the 5G system, the broadcast information no longer includes the system bandwidth information. Therefore, a user cannot acquire the time-frequency resource of the control channel. In this way, the user cannot obtain inbound bandwidth information.

To resolve the foregoing problem, the embodiments of this application provide an information transmission method, and configuration information of a synchronization signal block may be used to notify the terminal device of a time-frequency resource of a control channel. In addition, frequency diversity gains are obtained as many as possible when relatively low interference to a neighboring cell is ensured.

Figure 3:
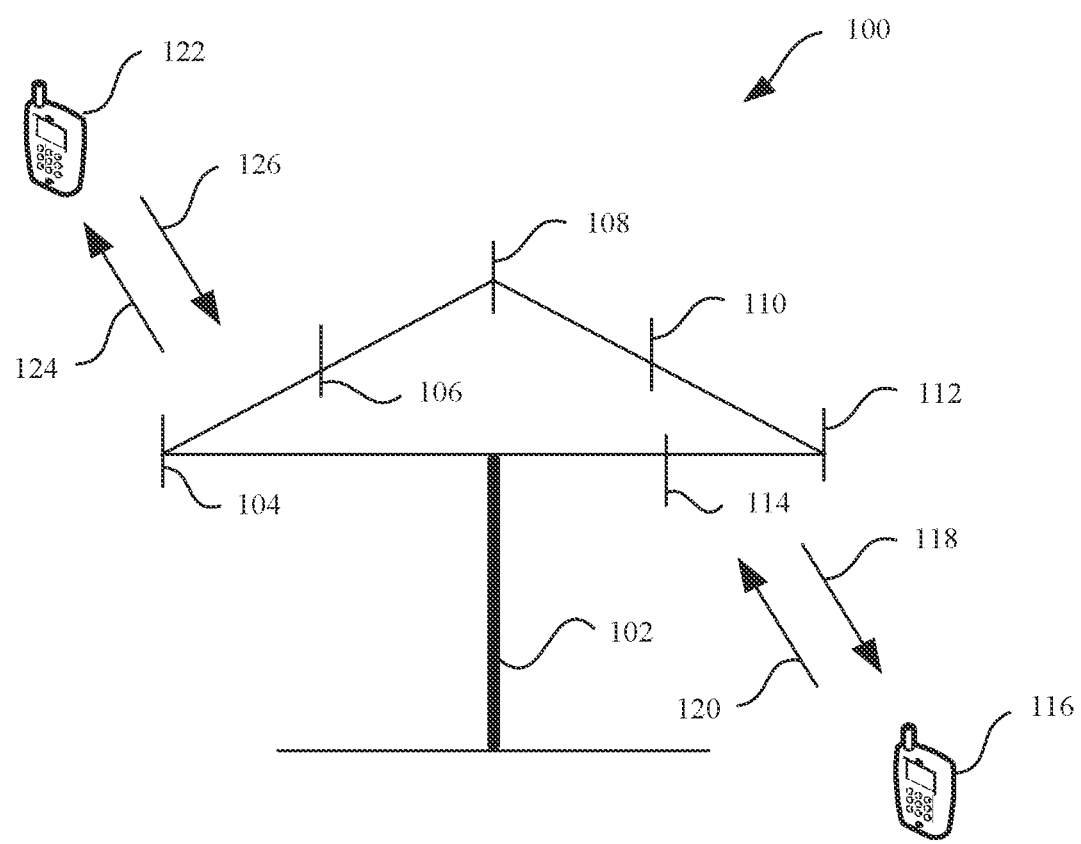
FIG. 3 is a schematic diagram of a communications system that is applicable to an information transmission method and apparatus in this application.

FIG. 3 is a schematic diagram of a communications system that is applicable to an information transmission method and apparatus in this application. As shown in FIG. 3, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain may include a plurality of components (for example, a processor, a modulator, a multiplexer, an encoder, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or the terminal device 122. The terminal devices 116 and 122 may be, for example, a cellular phone, a smartphone, a portable computer, a handheld communications device, a handheld computing device, a satellite radio apparatus, a global positioning system, a PDA, and/or any another suitable device configured to perform communication in the wireless communications system 100.

As shown in FIG. 3, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in art FDD system the forward link 118 and the reverse link 120 may use different frequency bands, and the forward link 124 and the reverse link 126 may use different frequency bands.

For another example, in a TDD system and a full duplex (full duplex) system, the forward link 118 and the reverse link 120 may use a same frequency band, and the forward link 124 and the reverse link 126 may use a same frequency band.

Each antenna (or an antenna group including a plurality of antennas) and/or area that are/is designed for communication is referred to as a sector of the network device 102. For example, the antenna group may be designed to communicate with a terminal device in a sector within a coverage area of the network device 102. When the network device 102 respectively communicates with the terminal devices 116 and 122 over the forward links 118 and 124, transmit antennas of the network device 102 may increase signal-to-noise ratios of the forward links 118 and 124 through beamforming. In addition, when the network device 102 sends, through beamforming, signals to the terminal devices 116 and 122 that are randomly distributed in a related coverage area, interference to a mobile device in a neighboring cell is less than that caused when a network device sends, through a single antenna, signals to all terminal devices that belong to the network device.

Within a given time, the network device 102, the terminal device 116, or the terminal device 122 may be a wireless communications sending apparatus and/or a wireless communications receiving apparatus. When sending data, the wireless communications sending apparatus may encode data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of data, and the transport block may be segmented to generate a plurality of code blocks.

In addition, the communications system 100 may be a PLMN network, a D2D network, an M2M network, or another network. FIG. 3 is merely a simplified schematic diagram of an example. The network may further include another network device that is not shown in FIG. 3.

Figure 4:
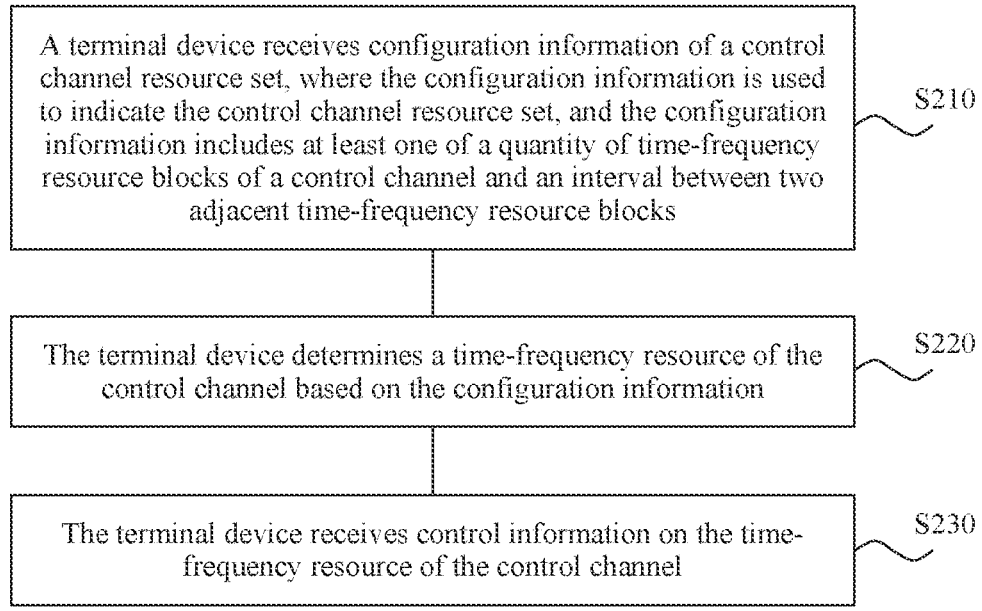
FIG. 4 is a schematic flowchart of an information transmission method according to an embodiment of this application.

With reference to FIG. 4, the following describes in detail the information transmission method provided in this application. FIG. 4 is a schematic flowchart of an information transmission method 200 according to an embodiment of this application. The method 200 may be applied to the scenario shown in FIG. 3, and certainly may also be applied to another communications scenario. This is not limited in the embodiments of this application.

As shown in FIG. 4, the method 200 includes the following steps.

S210. A terminal device receives configuration information of a control channel resource set, where the configuration information is used to indicate the control channel resource set, and the configuration information includes at least one of a quantity of time-frequency resource blocks of a control channel and an interval between two adjacent time-frequency resource blocks.

S220. The terminal device determines a time-frequency resource of the control channel based on the configuration information.

S230. The terminal device receives control information on the time-frequency resource of the control channel.

Specifically, in S210, when the terminal device initially accesses a system, the terminal device first determines the time-frequency resource of the control channel. After determining the time-frequency resource of the control channel, the terminal device receives the control information on the time-frequency resource of the control channel. The control channel is mainly used to transmit the control information or synchronous data, and mainly includes one or more of common search space CSS and terminal-device-specific search space. The common search space is a time-frequency resource on which the terminal device receives broadcast control information or terminal-device-specific control information in a serving cell, and the broadcast control information includes at least one type of control information for scheduling paging information and control information for indicating random access response information. The synchronization signal block includes broadcast information and a synchronization signal, the broadcast information includes the configuration information of the control channel resource set, and the synchronization signal carries a cell identity. The terminal device receives the configuration information that is sent by a network device and that is of the control channel resource set. The configuration information is used to indicate the control channel resource set, and the configuration information includes at least one of the quantity of time-frequency resource blocks of the control channel and the interval between two adjacent time-frequency resource blocks. For example, when the configuration information includes the quantity of time-frequency resource blocks of the control channel, the interval between two adjacent time-frequency resource blocks may be predefined by the system, or when the configuration information includes the interval between two adjacent time-frequency resource blocks of the control channel, the quantity of time-frequency resource blocks of the control channel may be predefined by the system. The time-frequency resource of the control channel is inconsecutive and includes a plurality of time-frequency resource blocks, and there is an interval between the plurality of time-frequency resource blocks. For example, the plurality of time-frequency resource blocks may have a specific interval in frequency domain or a specific interval in time domain.

In S220, the terminal device determines the time-frequency resource of the control channel based on the configuration information. To be specific, the terminal device determines the time-frequency resource of the control channel based on the quantity of time-frequency resource blocks and information of the interval between two adjacent time-frequency resource blocks.

In S230, after determining the time-frequency resource of the control channel, the terminal device receives the control information on the time-frequency resource of the control channel, and determines, based on the received control information, a to-be-accessed cell and a bandwidth of the cell, to subsequently communicate with the network device.

It should be understood that the configuration information of the control channel resource set not only includes the quantity of time-frequency resource blocks of the control channel and the interval between two adjacent time-frequency resource blocks, but also includes other information or content that is related to the control channel resource set. This is not limited in this embodiment of this application.

It should be further understood that the configuration information of the control channel resource set may further include other information of the control channel resource set, for example, information about a frequency domain range of the control channel. This is not limited in this embodiment of this application.

It should also be understood that the time-frequency resource block may be a time-frequency resource block that has any granularity and that is specified in a protocol, for example, a PRB is used as a unit. This is not limited in this embodiment of this application.

In the information transmission method provided in this embodiment of this application, the configuration information of the control channel resource set is used to indicate the time-frequency resource of the control channel. The time-frequency resource of the control channel is inconsecutive and includes a plurality of time-frequency resource blocks, and there is an interval between the plurality of time-frequency resource blocks. Therefore, even if a relatively large quantity of signal paths are generated in a channel environment, the terminal device may obtain a better frequency diversity gain when receiving the control information on the control channel, to improve transmission efficiency.

Optionally, in an embodiment, the time-frequency resource block includes at least one resource element group REG set, and the REG set includes a plurality of REGs that are consecutive or adjacent in time domain or in frequency domain.

Figure 5:
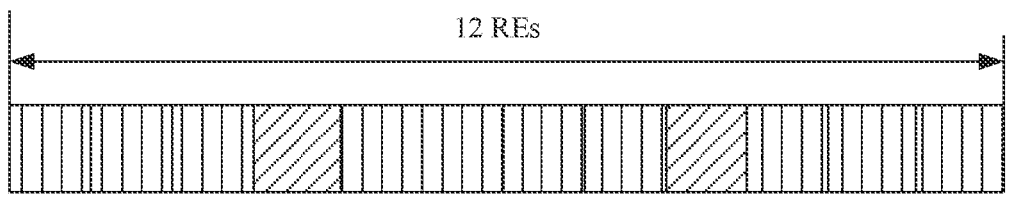
FIG. 5 is a schematic diagram of a REG according to an embodiment of this application.
Figure 5:
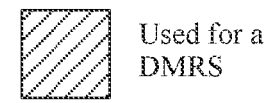
Figure 5:
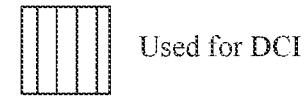
Figure 6:
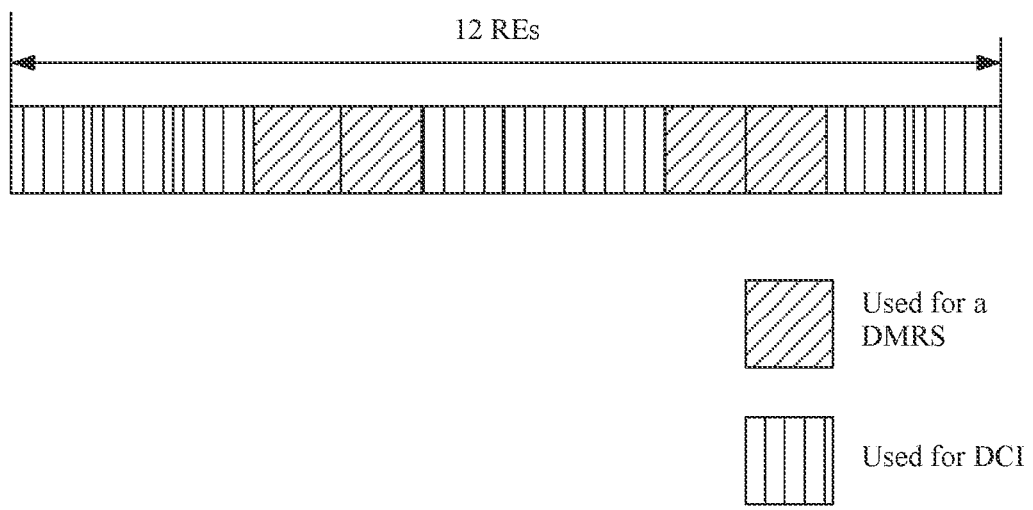
FIG. 6 is a schematic diagram of a REG according to another embodiment of this application.

To improve channel estimation accuracy, a plurality of REGs that are consecutive in time domain or in frequency domain may constitute one REG set, or a plurality of REGs that are consecutive in time domain or in frequency domain may be bundled (bundling) together to constitute one REG bundle (bundle). The REG set may be referred to as the REG bundle (bundle), or may be referred to as the REG group (group). A specific name of the REG set is not limited in this application. Because a physical downlink control channel (physical downlink control channel, PDCCH) is mapped to a REG by using a CCE, a plurality of REGs corresponding to each CCE are bundled together to constitute one or more REG sets. For each REG set, the terminal device may perform joint channel estimation by using a demodulation reference signal (demodulation reference signal, DMRS) available in the REG set instead of a single REG, thereby improving channel estimation accuracy. FIG. 5 and FIG. 6 are schematic diagrams of a REG according to an embodiment of this application. In FIG. 5, the REG includes 12 REs. Two REs are used for a DMRS, and 10 REs are used for downlink control information (downlink control information, DCI). In FIG. 6, four REs are used for a DMRS, and eight REs are used for DCI.

This time-frequency resource block includes at least one REG set, and each REG set includes a plurality of REGs that is consecutive or adjacent in time domain or in frequency domain. REGs that are consecutive in frequency domain mean that REG numbers are consecutive in frequency domain. To be specific, there is no subcarrier spacing between two adjacent REGs, subcarriers of the two adjacent REGs are consecutive, and there is no idle frequency domain part between the two adjacent REGs. REGs that are consecutive in time domain mean that REG numbers are consecutive in time domain. To be specific, there is no OFDM symbol spacing between two adjacent REGs, and OFDM symbols of the two adjacent REGs are consecutive. REGs that are adjacent in frequency domain mean that REG numbers are inconsecutive in frequency domain. To be specific, there is a subcarrier spacing between two adjacent REGs, the subcarrier spacing may be used to communicate with another terminal device or transmit other signaling, and subcarriers of the two adjacent REGs are inconsecutive. REGs that are adjacent in time domain mean that REG numbers are inconsecutive in time domain. To be specific, there is an OFDM symbol spacing between two adjacent REGs, and OFDM symbols of the two adjacent REGs are inconsecutive.

Figure 7:
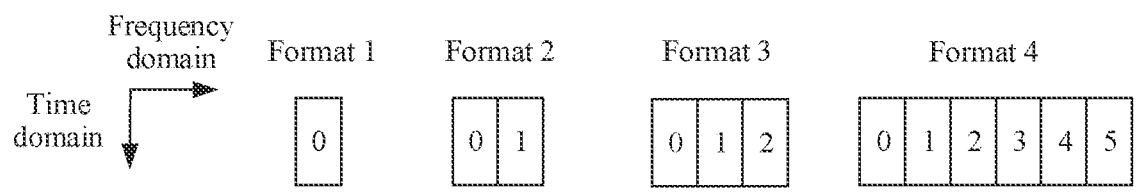
FIG. 7 is a schematic diagram of a REG set according to an embodiment of this application.

FIG. 7 is a schematic diagram of a REG set according to an embodiment of this application. In FIG. 7, the REG set may have four different formats. A REG set in a format 1 includes one REG, a REG set in a format 2 includes two REGs that are consecutive in frequency domain, a REG set in a format 3 includes three REGs that are consecutive in frequency domain, and a REG set in a format 4 includes six REGs that are consecutive in frequency domain.

Figure 8:
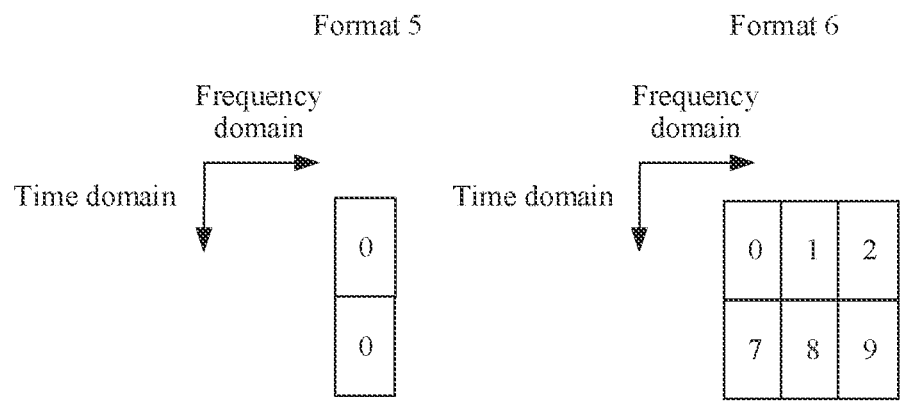
FIG. 8 is a schematic diagram of a REG set according to another embodiment of this application.

FIG. 8 is a schematic diagram of a REG set according to another embodiment of this application. The REG set may have two different formats. A REG set in a format 5 includes two REGs that are consecutive in time domain. A REG set in a format 6 includes six REGs in which three REGs numbered 0, 1, and 2 are consecutive in frequency domain, three REGs numbered 7, 8, and 9 are consecutive in frequency domain, the REGs numbered 0 and 7 are consecutive in time domain, the REGs numbered 1 and 8 are consecutive in time domain, and the REGs numbered 2 and 9 are consecutive in time domain.

Figure 9:
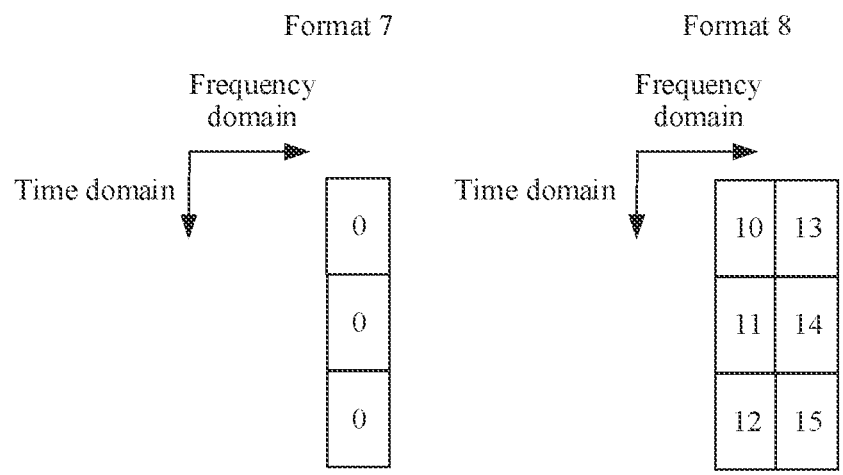
FIG. 9 is a schematic diagram of a REG set according to another embodiment of this application.

FIG. 9 is a schematic diagram of a REG set according to another embodiment of this application. The REG set may have two different formats. A REG set in a format 7 includes three REGs that are consecutive in time domain. A REG set in a format 8 includes six REGs which three REGs numbered 10, 11, and 12 are consecutive in time domain, three REGs numbered 13, 14, and 15 are consecutive in time domain, and the REGs numbered 10 and 13 are consecutive in frequency domain.

It should be understood that a quantity of REGs that are consecutive or adjacent in frequency domain or in time domain may be obtained based on the format of the REG set.

A bundling size of the REG or a bundling format of the REG may be predefined based on the control resource set or the search space, and therefore, are commonly known to both the terminal device and the network device. Alternatively, the network device may notify the terminal device of a bundling size of the REG or a bundling format of the REG through signaling, for example, through higher layer signaling, such as radio resource control (radio resource control, RRC) signaling. For example, the terminal device may be notified based on configuration information of the control resource set or the search space.

Optionally, in an embodiment, any one of the at least one REG set meets at least one of the following conditions: m PRBs that are consecutive or adjacent in frequency domain, where m is a positive integer; or n symbols that are consecutive or adjacent in time domain, where n is a positive integer.

For example, m may be 1, 2, 3, 6, 12, or the like, or may be 2, 4, 8, or 16, and n may be 1, 2, 3, or the like.

It should be noted that adjacency in frequency domain herein means that a plurality of RBs that are configured in the control resource set may be inconsecutive in frequency domain, but after the RBs are sorted in ascending order or in descending order in frequency domain, indexes of the RBs may be consecutive. Adjacency in time domain herein means that a plurality of RBs that are configured in the control resource set may be inconsecutive in time domain, but after the RBs are sorted in ascending order or in descending order in time domain, indexes of the RBs may be consecutive.

The time-frequency resource block includes at least one REG set. For example, the control channel includes a plurality of REG sets in frequency domain, there is an interval between two adjacent REG sets in the plurality of REG sets, and the interval includes at least one non-zero value. To be specific, for a cell, the control channel is inconsecutive in frequency domain, and there is an interval between the plurality of REG sets that constitute the time-frequency resource of the control channel. A value of the interval may be predefined, or may be configured as different values based on different circumstances. The value of the interval includes at least one non-zero value. If the value of the interval is zero, it is equivalent to that the time-frequency resource of the control channel is consecutive in frequency domain. The interval may have a plurality of values, and the plurality of values of the interval may be the same or different.

Figure 10:
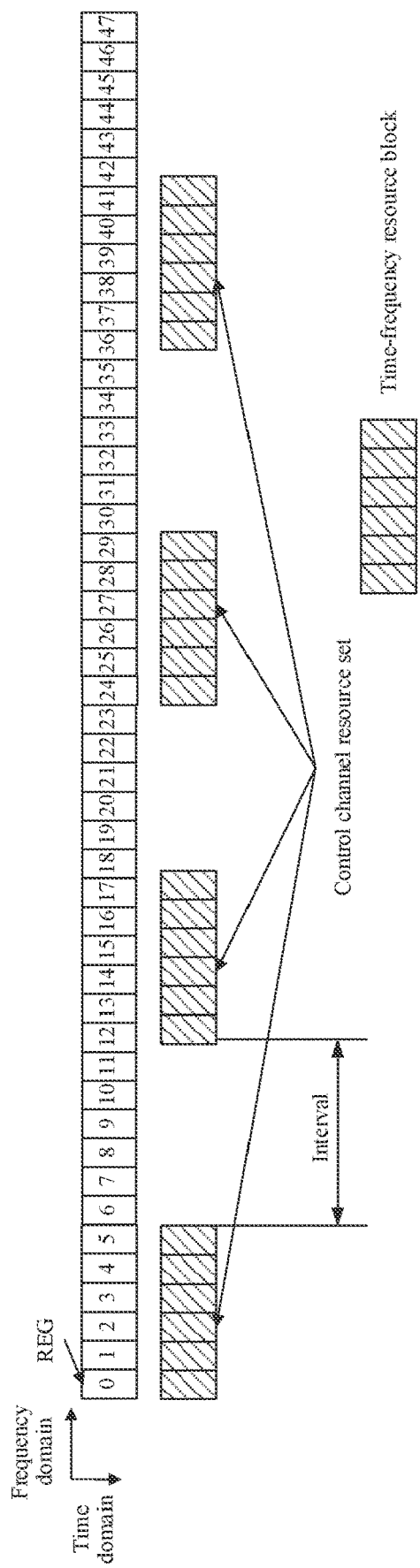
FIG. 10 is a schematic diagram of a control channel resource set according to an embodiment of this application.

The following describes the information transmission method in the embodiment of this application in detail with reference to FIG. 10. FIG. 10 is a schematic diagram of a control channel resource set according to an embodiment of this application. As shown in FIG. 10, the control channel resource set includes only one OFDM symbol in time domain, and occupies 48 REGs in an entire frequency domain, to be specific, REGs numbered from 0 to 47. However, the control channel is inconsecutive in frequency domain. The control channel includes four REG sets in total in frequency domain, and there is an interval between two adjacent REG sets, to be specific, there are four intervals. Each interval includes six REGs. Each REG set also includes six REGs that are consecutive in frequency domain, to be specific, the terminal device receives control information within the four REG sets in frequency domain.

It should be understood that, as shown in FIG. 10, the schematic diagram of the control channel in frequency domain is merely a specific example of this embodiment of this application, and should not be constructed as any limitation on this embodiment of this application. For example, the control channel may occupy another quantity of REGs in an entire frequency domain, the control channel may include another quantity of REG sets in frequency domain, and a plurality of intervals may be different. The interval may be greater than, equal to, or less than the REG set in frequency domain. This is not limited in this embodiment of this application.

It should be further understood that a unit of a frequency domain resource occupied by the control channel in frequency domain is a REG set or a REG. In this embodiment of this application, the unit of the frequency domain resource occupied by the control channel in frequency domain may be alternatively a PRB, a PRB set, a CCE, or the like. This is not limited in this embodiment of this application.

Optionally, in an embodiment, the REG set includes N REGs, where a value of N is any one of 1, 2, 3, and a positive integer multiple of 2 or 3.

Specifically, the REG set includes REGs, and the REG includes one of OFDM symbol in time domain and 12 subcarriers that are consecutive in frequency domain. The REG set may include N REGs, where a value of N is any one of 1, 2, 3, and a positive integer multiple of 2 or 3. To be specific, the REG set may include two REGs, three REGs, six REGs, or the like, provided that a quantity of REGs that constitute the REG set is 1, 2, 3, or a positive integer multiple of 2 or 3.

It should be understood that the REG set may include another quantity of REGs. This is not limited in this embodiment of this application.

Optionally, in an embodiment, the interval between adjacent time-frequency resource blocks includes, in frequency domain, a frequency domain resource corresponding to an integer quantity of REGs or a frequency domain resource corresponding to an integer quantity of REG sets.

Specifically, a granularity of the frequency domain interval between adjacent time-frequency resource blocks may be a REG, to be specific, the frequency domain interval may include a frequency domain resource corresponding to an integer quantity of REGs. For example, the frequency domain interval includes a frequency domain resource corresponding to five REGs. Because the frequency domain interval includes a plurality of different values, the frequency domain interval may correspond to different frequency domain resources. The frequency domain interval may be greater than, equal to, or less than one REG set in frequency domain.

It should be understood that the granularity of the frequency domain interval may be alternatively a frequency domain size occupied by a PRB or another frequency domain unit. This is not limited in this embodiment of this application.

Optionally, in an embodiment, the interval between adjacent time-frequency resource blocks includes, in frequency domain, a frequency domain resource corresponding to an integer quantity of REG sets.

Specifically, a granularity of the frequency domain interval between adjacent time-frequency resource blocks may be a REG set, to be specific, the frequency domain interval may include a frequency domain resource corresponding to an integer quantity of REG sets. For example, the frequency domain interval is a frequency domain resource corresponding to five REG sets. When the frequency domain interval is a frequency domain resource corresponding to one REG set, the frequency domain interval is the same as the REG set in frequency domain, as shown in a control channel resource in FIG. 5.

It should be understood that the granularity of the frequency domain interval may be alternatively a PRB set or another frequency domain unit set. This is not limited in this embodiment of this application.

Optionally, in an embodiment, the terminal device determines inbound bandwidth information of the terminal device based on the interval between adjacent time-frequency resource blocks and/or at least one REG set.

Specifically, the information about a bandwidth through which the terminal device accesses the system may be determined by using a frequency domain resource of the control channel. Because the control channel has an interval in frequency domain, the information may be determined by using the interval and the at least one time-frequency resource blocks. The schematic diagram of the control channel in frequency domain, as shown in FIG. 10, is used as an example for descriptions. In FIG. 10, the interval between two adjacent time-frequency resource blocks is six REGs, in other words, the interval is a frequency domain corresponding to the six REGs. In four time-frequency resource blocks, each time-frequency resource block includes 11 REGs. In other words, there are four intervals and four time-frequency resource blocks. Therefore, the inbound bandwidth of the terminal device is 4×6+4×6=48, to be specific, the bandwidth through which the terminal device accesses the system is a bandwidth value that corresponds to 48 REGs.

Alternatively, the terminal device determines, based on the interval, the information about a bandwidth through which the terminal device accesses the system. For example, the terminal device determines, based on predefinition, that K times a frequency domain resource corresponding to the interval is the bandwidth through which the terminal device accesses the system. For another example, the terminal device may determine, according to an equation that is related to a frequency domain resource corresponding to the interval, the information about the bandwidth through which the terminal device accesses the system. This is not limited in this embodiment of this application. Similarly, when the terminal device determines, based on at least one time-frequency resource block, the information about the bandwidth through which the terminal device accesses the system, the terminal device may determine, based on predefinition, that K times a frequency domain resource corresponding to the at least one time-frequency resource block is the bandwidth through which the terminal device accesses the system. For another example, the terminal device may determine, according to an equation that is related to a frequency domain resource corresponding to the at least one time-frequency resource block, the information about the bandwidth through which the terminal device accesses the system. This is not limited in this embodiment of this application.

Optionally, in an embodiment, an offset that is from a frequency domain center location of a synchronization signal block to a frequency domain center location of the resource set is predefined, or is indicated by the configuration information; and the synchronization signal block includes the configuration information.

Specifically, because control channels of different cells may overlap partially in frequency domain, to be specific, the control channels of the different cells may have an overlapping part in frequency domain. Therefore, the different cells are easily interfered by neighboring cells when receiving control information on respective control channels, in this embodiment of this application, a frequency domain center location of a control channel of each cell has offset relative to the frequency domain center location of the broadcast information, and different cells have different offsets. To be specific, the frequency domain center location of the resource set has offset relative to the frequency domain center location of the synchronization signal block, and an offset corresponds to a cell identity. The synchronization signal block includes broadcast information and a synchronization signal, the broadcast information includes the configuration information of the control channel resource set, and the synchronization signal carries a cell identity. To be specific, the terminal device determines the offset based on the cell identity in the synchronization signal, to determine the time-frequency resource of the control channel. The cell identity is carried on the synchronization signal block sent by the network device. The offset that is from the frequency domain center location of the synchronization signal block to the frequency domain center location of the resource set is determined based on the cell identity in the synchronization signal block. In this way, control channels of different cells do not overlap or have a smaller overlapping part in frequency domain, to reduce interference suffered by the different cells from neighboring cells when control information is received on the respective control channels in the different cells. The offset may be predefined by the system, to be specific, specified in a protocol; or may be indicated by the configuration information. This is not limited in this embodiment of this application.

Optionally, a quantity of offsets that is between the frequency domain center location of the control channel resource set and the frequency domain center location of the synchronization signal block may be determined based on the time-frequency resource block and the interval between two adjacent time-frequency resource blocks.

The inbound bandwidth of the terminal device is determined based on the time-frequency resource block and the interval between two adjacent time-frequency resource blocks, and a quantity of frequency offsets of the control channel resource set may be derived based on the inbound bandwidth.

Figure 11:
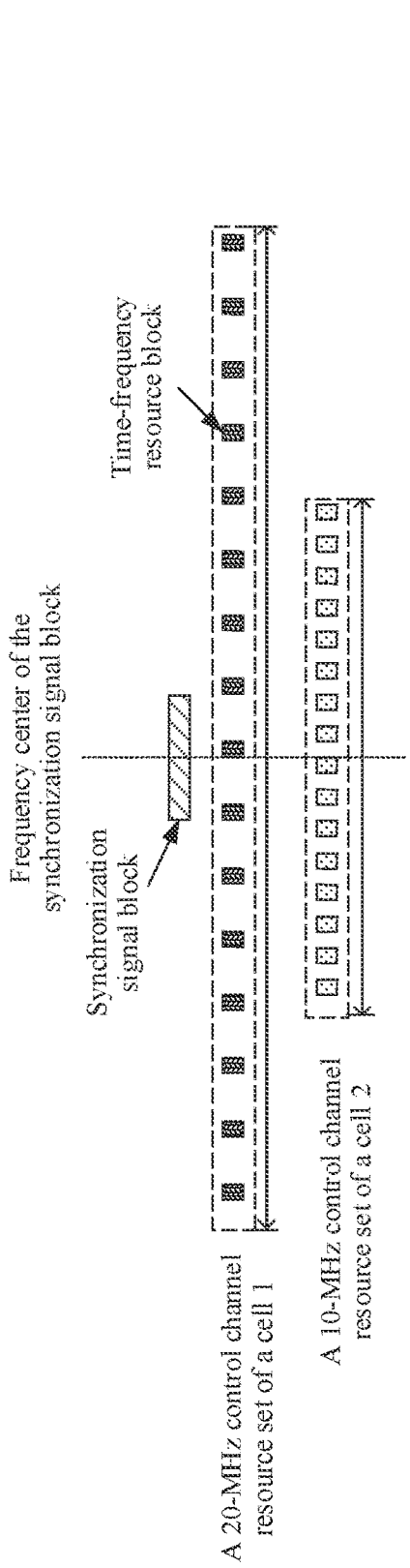
FIG. 11 is a schematic diagram of frequency domain center location offset of control channel resource sets of different cells according to an embodiment of this application.

Specifically, in an implementable method, as shown in FIG. 11, a bandwidth occupied by a control channel resource set of a cell 1 is 20 MHz, and corresponds to four pieces of time domain offset. A bandwidth occupied by a control channel resource set of a cell 2 is 10 MHz, and corresponds to two pieces of time domain offset.

FIG. 11 is a schematic diagram of frequency domain offset of control channel resource sets of different cells according to an embodiment of this application. In FIG. 11, the bandwidth occupied by the control channel resource set of the cell 1 is 20 MHz, and the bandwidth occupied by the control channel resource set of the cell 2 is 10 MHz. The control channel resource set of the cell 1 and the control channel resource set of the cell 2 are inconsecutive in frequency domain. A frequency domain center of the control channel resource set of the cell 1 and a frequency domain center of the control channel resource set of the cell 2 have different offsets relative to a frequency domain center location of the synchronization signal block. Offset that is of the frequency domain center of the control channel resource set of the cell 1 and that is relative to the frequency domain center location of the synchronization signal block is one REG set to the left in frequency domain. Offset that is of the frequency domain center of the control channel resource set of the cell 2 and that is relative to the frequency domain center location of the synchronization signal block is one REG set to the right in frequency domain. After the offsetting, the control channel resource set of the cell 1 and the control channel resource set of the cell 2 have a smaller overlapping part or do not overlap in frequency domain. This may reduce interference suffered by different cells from neighboring cells when control information is received on respective control channel resource sets in the different cells.

Figure 12:
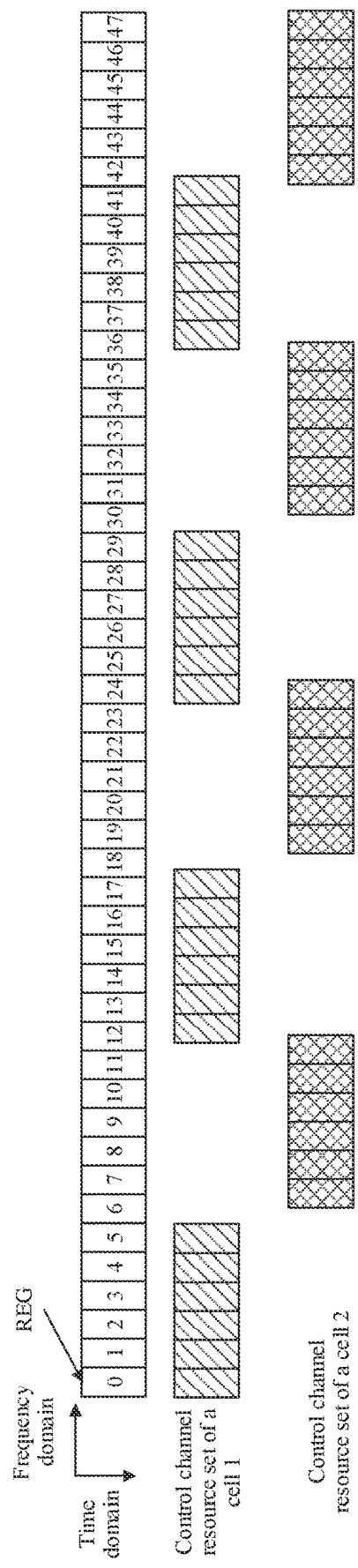
FIG. 12 is a schematic diagram of frequency domain offset of control channel resource sets of different cells according to another embodiment of this application.

FIG. 12 is a schematic diagram of frequency domain offset of control channel resource sets of different cells according to another embodiment of this application. In FIG. 12, a control channel resource set of a cell 1 is also inconsecutive in frequency domain and has an interval. Therefore, a cell 2 may be configured to receive control information on a frequency domain interval part of the control channel resource set of the cell 1, to be specific, the frequency domain interval part of the control channel resource set of the cell 1 is a frequency domain part of a control channel resource set of the cell 2. In this way, the control channel resource set of the cell 1 and the control channel resource set of the cell 2 do not overlap in frequency domain, to reduce interference suffered by different cells from neighboring cells when control information is received on respective control channel resource sets in the different cells.

It should be understood that FIG. 11 and FIG. 12 show an example in which the control channel resource sets of the two cells do not overlap in frequency domain, to illustrate that control channels of different cells do not overlap in frequency domain. However, this embodiment of this application is not limited thereto. For example, control channels of more cells may not overlap in frequency domain, to be specific, different offsets exist relative to the frequency domain center location of the broadcast information. This is not limited in this embodiment of this application.

In the information transmission method provided in this embodiment of this application, a control channel of a cell is inconsecutive in an entire frequency domain and has a frequency domain interval. The terminal device receives control information from the control channel of this format, and may also obtain a better frequency diversity gain, to improve transmission efficiency. However, frequency domain center locations of control channels of different cells have different offsets relative to the frequency domain center location of the control channel resource set, to be specific, the control channels of the different cells do not overlap in frequency domain, to reduce interference suffered by the different cells from neighboring cells when control information is received on the respective control channels in the different cells. In addition, the configuration information of the control channel resource set is used to indicate the time-frequency resource of the control channel, to be specific, determine the frequency domain resource of the control channel, to resolve a problem that the time-frequency resource of the control channel cannot be indicated in 5G.

It should be understood that al least one of the quantity of time-frequency resource blocks and the interval between two adjacent time-frequency resource blocks is predefined.

Specifically, the quantity of time-frequency resource blocks included in the control channel may be predefined in a protocol. When the quantity of time-frequency resource blocks included in the control channel is predefined in a protocol, the terminal device may not be notified of the quantity through signaling. Therefore, signaling overheads can be reduced. Alternatively, the quantity of time-frequency resource blocks included in the control channel may be configured by the network device. When the quantity of time-frequency resource blocks is configured by the network device, different quantities of time-frequency resource blocks may be configured, and the configuration information is used to indicate a specific quantity of time-frequency resource blocks to the terminal device. This can provide flexibility of resource configuration, and improve spectrum utilization.

Similarly, the interval between two adjacent time-frequency resource blocks may be predefined in a protocol, or may be configured by the network device and indicated to the terminal device by using the configuration information. This is not limited in this embodiment of this application.

It should be understood that at least one of a quantity of REG sets included in the time-frequency resource block and a quantity of REGs included in the REQ set is predefined, or is indicated by the configuration information.

Specifically, the quantity of REG sets included in the time-frequency resource block may be predefined in a protocol, or may be configured by the network device and indicated to the terminal device by using the configuration information. The quantity of REGs included in the REG set may also be predefined in a protocol, or may be configured by the network device and indicated to the terminal device by using the configuration information. This is not limited in this embodiment of this application.

Figure 13:
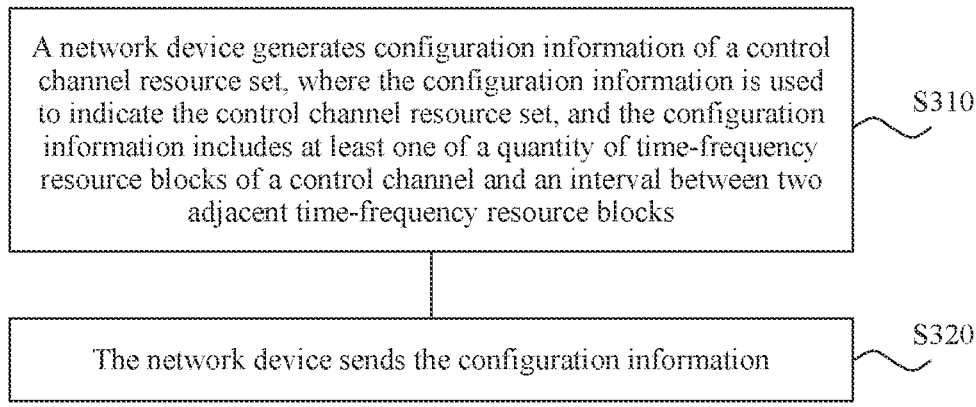
FIG. 13 is a schematic flowchart of an information transmission method according to another embodiment of this application.

An embodiment of this application further provides an information transmission method 300. The method 300 may be executed by a network device. FIG. 13 is a schematic flowchart of an information transmission method 300 according to an embodiment of this application. As shown in FIG. 13, the method 300 includes the following steps.

S310. The network device generates configuration information of a control channel resource set, where the configuration information is used to indicate the control channel resource set, and the configuration information includes at least one of a quantity of time-frequency resource blocks of a control channel and an interval between two adjacent time-frequency resource blocks.

S320. The network device sends the configuration information.

Specifically, when the terminal device initially accesses a system, the network device notifies a terminal device of the time-frequency resource of the control channel, and the terminal device receives the control information on the time-frequency resource. The control channel is mainly used to transmit signaling or synchronous data. In a 5G system, broadcast information no longer includes system bandwidth information. Therefore, in S310, the network device generates the configuration information of the control channel resource set, and the configuration information is used to indicate the control channel resource set. The control channel includes common search space CSS, a broadcast channel, and a dedicated control channel. The configuration information includes at least one of the quantity of time-frequency resource blocks of the control channel and the interval between two adjacent time-frequency resource blocks. For example, when the configuration information includes the quantity of time-frequency resource blocks of the control channel, the interval between two adjacent time-frequency resource blocks may be predefined by the system. When the configuration information includes the interval between two adjacent time-frequency resource blocks of the control channel, the quantity of time-frequency resource blocks of the control channel may be predefined by the system. The time-frequency resource of the control channel is inconsecutive and includes a plurality of time-frequency resource blocks, and there is an interval between the plurality of time-frequency resource blocks. For example, the plurality of time-frequency resource blocks may have a specific interval in frequency domain or a specific interval in time domain. After generating the configuration information of the control channel resource set, the network device sends the configuration information to the terminal device. After determining the time-frequency resource of the control channel, the terminal device receives the control information on the time-frequency resource of the control channel, and determines, based on the received control information, a to-be-accessed cell and a bandwidth of the cell, to subsequently communicate e network device.

In the information transmission method provided in this embodiment of this application, the network device uses the configuration information of the control channel resource set to indicate the time-frequency resource of the control channel, the time-frequency resource of the control channel is inconsecutive and includes a plurality of time-frequency resource blocks, and there is an interval between the plurality of time-frequency resource blocks. Therefore, even if a relatively large quantity of signal paths are generated in a channel environment, the terminal device may obtain a better frequency diversity gain when receiving the control information on the control channel, to improve transmission efficiency.

Optionally, in an embodiment, the time-frequency resource block includes at least one resource element group REG set, and the REG set includes a plurality of REGs that are consecutive or adjacent in time domain or in frequency domain.

Specifically, the time-frequency resource block includes at least one REG set, and each REG set includes a plurality of REGs that is consecutive or adjacent in time domain or in frequency domain. REGs that are consecutive in frequency domain mean that REG numbers are consecutive in frequency domain. To be specific, there is no subcarrier spacing between two adjacent REGs, subcarriers of the two adjacent REGs are consecutive, and there is no idle frequency domain part between the two adjacent REGs. REGs that are consecutive in time domain mean that REG numbers are consecutive in time domain. To be specific, there is no OFDM symbol spacing between two adjacent REGs, OFDM symbols of the two adjacent REGs are consecutive, and there is no idle time domain part between the two adjacent REGs. REGs that are adjacent in frequency domain mean that REG numbers are inconsecutive in frequency domain. To be specific, there is a subcarrier spacing between two adjacent REGs, the subcarrier spacing may be used to communicate with another terminal device or transmit other signaling, and subcarriers of the two adjacent REGs are inconsecutive. REGs that are adjacent in time domain mean that REG numbers are inconsecutive in time domain. To be specific, there is an OFDM symbol spacing between two adjacent REGs, and OFDM symbols of the two adjacent REGs are inconsecutive. The time-frequency resource block includes at least one resource element group REG set. For example, the control channel includes a plurality of REG sets in frequency domain, there is an interval between two adjacent REG sets in the plurality of REG sets, and the interval includes at least one non-zero value. To be specific, for a cell, the control channel is inconsecutive in frequency domain, and there is an interval between the plurality of REG sets that constitute the time-frequency resource of the control channel. A value of the interval may be set according to a system protocol, or may be configured as different values based on different circumstances. The value of the interval includes at least one non-zero value. If the value of the interval is zero, it is equivalent to that the time-frequency resource of the control channel is consecutive in frequency domain. The interval may have a plurality of values, and the plurality of values of the interval may be the same or different.

It should be understood that the time-frequency resource block may alternatively include at least one PRB set, and the PRB set includes a plurality of PRBs that are consecutive or adjacent in time domain or in frequency domain. This is not limited in this embodiment of this application.

Optionally, in an embodiment, the REG set includes N REGs, where a value of N is any one of 1, 2, 3, and a positive integer multiple of 2 or 3.

Specifically, the REG set includes REGs, and the REG includes one OFDM symbol in time domain and 12 subcarriers that are consecutive in frequency domain. The REG set may include N REGs, where a value of N is any one of 1, 2, 3, and a positive integer multiple of 2 or 3. To be specific, the REG set may include two REGs, three REGs, six REGs, or the like, provided that a quantity of REGs that constitute the REG set is 1, 2, 3, or a positive integer multiple of 2 or 3. Optionally, in an embodiment, the interval between adjacent time-frequency resource blocks includes, in frequency domain, a frequency domain resource corresponding to an integer quantity of REGs or a frequency domain resource corresponding to an integer quantity of REG sets.

Optionally, in an embodiment, the interval between adjacent time-frequency resource blocks includes, in frequency domain, a frequency domain resource corresponding to an integer quantity of REGs or a frequency domain resource corresponding to an integer quantity of REG sets.

Specifically, a granularity of the interval between adjacent time-frequency resource blocks may be a REG, to be specific, a frequency domain interval may include an integer quantity of REGs. For example, the frequency domain interval is a frequency domain resource corresponding to five REGs. Because the frequency domain interval includes a plurality of different values, the frequency domain interval may correspond to different frequency domain resources. The interval may be greater than, equal to, or less than one REG set in frequency domain.

It should be understood that the granularity of the frequency domain interval may be alternatively a PRB or another frequency domain unit. This is not limited in this embodiment of this application.

Optionally, in an embodiment, the interval between adjacent time-frequency resource blocks includes, in frequency domain, a frequency domain resource corresponding to an integer quantity of REG sets.

Specifically, a granularity of the frequency domain interval between adjacent time-frequency resource blocks may be a REG set, to be specific, the frequency domain interval may include a frequency domain resource corresponding to an integer quantity of REG sets. For example, the frequency domain interval is a frequency domain resource corresponding to five REG sets. When the frequency domain interval is a frequency domain resource corresponding to one REG set, the interval is the same as the REG set in frequency domain, as shown in a control channel frequency domain resource in FIG. 5.

It should be understood that the granularity of the frequency domain interval may be alternatively a PRB set or another frequency domain unit set. This is not limited in this embodiment of this application.

Optionally, in an embodiment, an offset that is between a frequency domain center location of the resource set and a frequency domain center location of a synchronization signal block is predefined, or is indicated by the configuration information; and the synchronization signal block includes the configuration information.

Specifically, because control channels of different cells may overlap partially in frequency domain, to be specific, the control channels of the different cells may have an overlapping part in frequency domain. Therefore, the different cells are easily interfered by neighboring cells when receiving control information on respective control channels. In this embodiment of this application, a frequency domain center location of a control channel of each cell has offset relative to the frequency domain center location of the broadcast information, and different cells have different offsets. To be specific, the frequency domain center location of the resource set has offset relative to the frequency domain center location of the synchronization signal block, and an offset corresponds to a cell identity. The synchronization signal block includes broadcast information and a synchronization signal, the broadcast information includes the configuration information of the control channel resource set, and the synchronization signal carries a cell identity. To be specific, the terminal device determines the offset based on the cell identity in the synchronization signal block. The offset that is from the frequency domain center location of the synchronization signal block to the frequency domain center location of the resource set is determined based on the cell identity in the synchronization signal block. In this way, control channels of different cells do not overlap or have a smaller overlapping part in frequency domain, to reduce interference suffered by the different cells from neighboring cells when control information is received on the respective control channels in the different cells. The offset may be predefined by the system, to be specific, specified in a protocol; or may be indicated by the configuration information. This is not limited in this embodiment of this application.

It should be understood that at least one of the quantity of time-frequency resource blocks and the interval between two adjacent time-frequency resource blocks is predefined.

Specifically, the quantity of time-frequency resource blocks included in the control channel may be predefined in a protocol. When the quantity of time-frequency resource blocks included in the control channel is predefined in a protocol, the terminal device may not be notified of the quantity through signaling. Therefore, signaling overheads can be reduced. Alternatively, the quantity of time-frequency resource blocks included in the control channel may be configured by the network device. When the quantity of time-frequency resource blocks is configured by the network device, different quantities of time-frequency resource blocks may be configured, and the configuration information is used to indicate a specific quantity of time-frequency resource blocks to the terminal device. This can provide flexibility of resource configuration, and improve spectrum utilization.

The interval between two adjacent time-frequency resource blocks may be predefined in a protocol, or may be configured by the network device and indicated to the terminal device by using the configuration information. This is not limited in this embodiment of this application.

It should be understood that at least one of a quantity of REG sets included in the time-frequency resource block and a quantity of REGs included in the REG set is predefined, or is indicated by the configuration information.

It should be further understood that sequence numbers of the foregoing processes do not mean execution sequences in the embodiments of this application. The execution sequences of the processes should be determined based on functions and internal logic of the processes, and should not be constructed as any limitation on the implementation processes of the embodiments of this application.

Specifically, the quantity of REG sets included in the time-frequency resource block may be predefined in a protocol, or may be configured by the network device and indicated to the terminal device by using the configuration information. The quantity of REGs included in the REG set may also be predefined in a protocol, or may be configured by the network device and indicated to the terminal device by using the configuration information. This is not limited in this embodiment of this application.

In the information transmission method provided in this embodiment of this application, a control channel of a cell is inconsecutive in an entire frequency domain and has a frequency domain interval. The network device sends control information on the control channel of this format, and may also obtain a better frequency diversity gain, to improve transmission efficiency. However, frequency domain center locations of control channels of different cells have different offsets relative to the frequency domain center location of the control channel resource set, to be specific, the control channels of the different cells do not overlap in frequency domain, to reduce interference suffered by the different cells from neighboring cells when control information is received on the respective control channels in the different cells. In addition, the configuration information of the control channel resource set is used to indicate the time-frequency resource of the control channel, to be specific, determine the frequency domain resource of the control channel, to resolve a problem that the time-frequency resource of the control channel cannot be indicated in 5G.

The foregoing describes the information transmission method in the embodiments of this application in detail with reference to FIG. 1 to FIG. 13. The following describes the terminal device and the network device in the embodiments of this application in detail with reference to FIG. 14 to FIG. 17.

Figure 14:
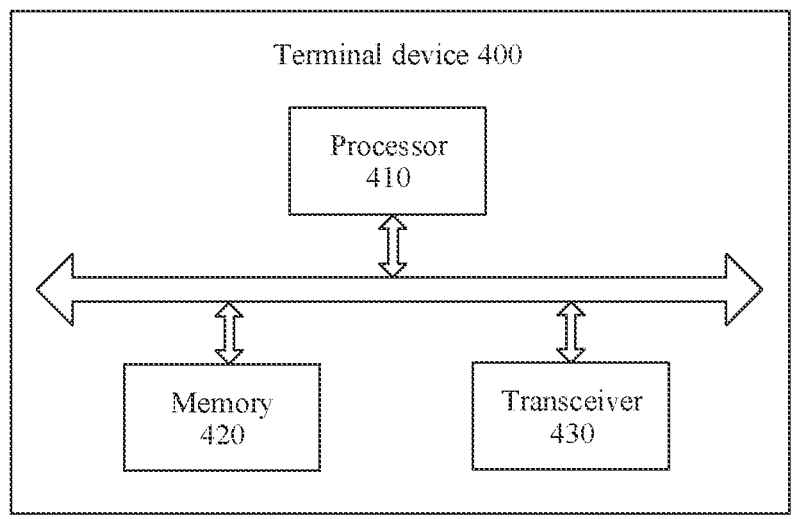
FIG. 14 is a schematic block diagram of a terminal device according to an embodiment of this application.

FIG. 14 is a schematic block diagram of a terminal device according to an embodiment of this application. It should be understood that an embodiment of the terminal device and a method embodiment correspond to each other. For similar descriptions, refer to the method embodiment. A terminal device 400 shown in FIG. 14 may be configured to perform steps corresponding to the terminal device in FIG. 4. The terminal device 400 includes a processor 410, a memory 420, and a transceiver 430. The processor 410, the memory 420, and the transceiver 430 are connected. The memory 420 stores instructions. The processor 410 is configured to execute the instructions stored in the memory 420. The transceiver 430, driven by the processor 410, is configured to send or receive a specific signal.

The transceiver 430 is configured to receive configuration information of a control channel resource set, where the configuration information is used to indicate the control channel resource set, and the configuration information includes at least one of a quantity of time-frequency resource blocks of a control channel and an interval between two adjacent time-frequency resource blocks.

The processor 410 is configured to determine a time-frequency resource of the control channel based on the configuration information.

The transceiver 430 is further configured to receive control information on the time-frequency resource of the control channel.

The terminal device provided in this embodiment of this application learns of the time-frequency resource of the control channel based on the configuration information of the control channel resource set. The time-frequency resource of the control channel is inconsecutive and includes a plurality of time-frequency resource blocks, and there is an interval between the plurality of time-frequency resource blocks. Therefore, even if a relatively large quantity of signal paths are generated in a channel environment, the terminal device may obtain a better frequency diversity gain when receiving the control information on the control channel, to improve transmission efficiency.

The components in the terminal device 400 are connected. To be specific, the processor 410, the memory 420, and the transceiver 430 communicate with each other through an inner connection path, to transmit a control signal and/or a data signal. The foregoing method embodiments in this application may be applied to the processor, or the processor implements the steps in the foregoing method embodiments. The processor may be an integrated circuit chip and has a signal processing capability. In an implementation process, the steps in the foregoing method embodiments can be implemented by using a hardware integrated logical circuit in the processor, or by using instructions in a form of software. The processor may be a central processing unit (central processing unit, CPU), a network processor (network processor, NP), a combination of a CPU and an NP, a digital signal processor (digital signal processor, DSP), an application-specific integrated circuit (application specific integrated circuit, ASIC), a field programmable gate array (field programmable gate array, FPGA) or another programmable logic device, a discrete gate, a transistor logic device, or a discrete hardware component. The processor may implement or perform the methods, steps, and logical block diagrams that are disclosed in this application. The general-purpose processor may be a microprocessor, or the processor may be any conventional processor or the like. The steps of the methods disclosed with reference to this application may be directly executed and accomplished by a hardware decoding processor, or be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the steps in the foregoing methods in combination with hardware of the processor.

Optionally, in another embodiment of this application, the time-frequency resource block includes at least one resource element group REG set, and the REG set includes a plurality of REGs that are consecutive or adjacent in time domain or in frequency domain.

Optionally, in another embodiment of this application, the interval between two adjacent time-frequency resource blocks includes, in frequency domain, a frequency domain resource corresponding to an integer quantity of REGs or a frequency domain resource corresponding to an integer quantity of REG sets.

Optionally, in another embodiment of this application, offset that is of a frequency domain center location of the resource set and that is relative to a frequency domain center location of a synchronization signal block is predefined, or is indicated by the configuration information; and the synchronization signal block includes the configuration information.

Optionally, in another embodiment of this application, at least one of the quantity of time-frequency resource blocks and the interval between two adjacent time-frequency resource blocks is predefined.

Optionally, in another embodiment of this application, at least one of a quantity of REG sets included in the time-frequency resource block and a quantity of REGs included in the REG set is predefined, or is indicated by the configuration information.

Optionally, in another embodiment of this application, the processor 410 is further configured to determine an offset based on a cell identity in the synchronization signal block.

In the terminal device provided in this embodiment of this application, the control channel for receiving the control information is inconsecutive in an entire frequency domain, and has a frequency domain interval. The terminal device receives the control information on the control channel of this format, and may also obtain a better frequency diversity gain, to improve transmission efficiency. Frequency domain center locations of control channels of different cells have different offsets relative to the frequency domain center location of the control channel resource set. Control channels of the terminal device in different cells do not overlap in frequency domain, to reduce interference suffered by the terminal device from a neighboring cell when the terminal device receives control information on the respective control channels in the different cells.

Figure 15:
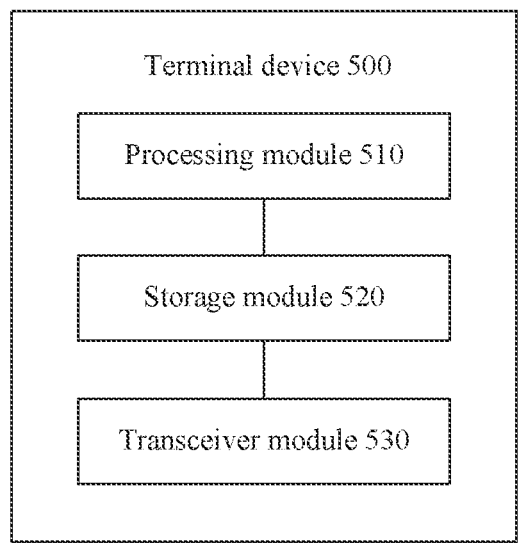
FIG. 15 is a schematic block diagram of a terminal device according to another embodiment of this application.

It should be noted that, in this embodiment of this application, the processor 410 may be implemented by a processing module, the memory 420 may be implemented by a storage module, and the transceiver 430 may be implemented by a transceiver module. As shown in FIG. 15, a terminal device 500 may include a processing module 510, a storage module 520, and a transceiver module 530.

The terminal device 400 shown in FIG. 14 or the terminal device 500 shown in FIG. 15 can implement the steps performed by the terminal device in FIG. 4. To avoid repetition, details are not described herein again.

Figure 16:
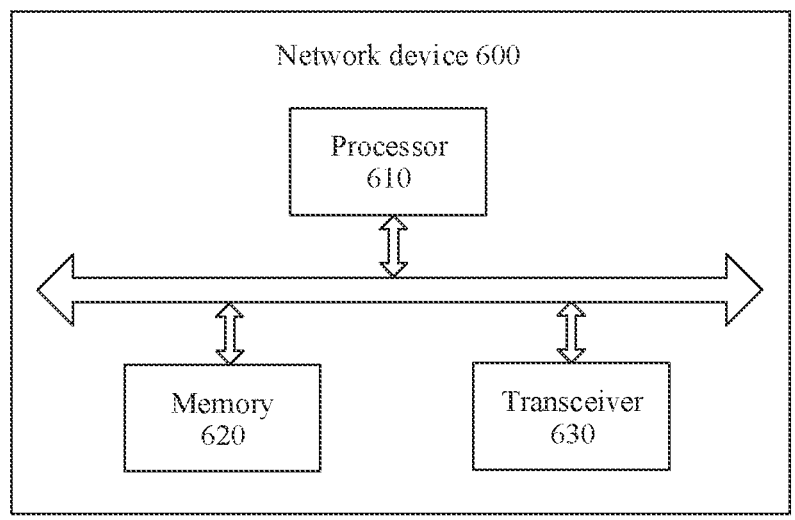
FIG. 16 is a schematic block diagram of a network device according to an embodiment of this application.

FIG. 16 is a schematic block diagram of a network device 600 according to an embodiment of this application. It should be understood that an embodiment of the network device and a method embodiment correspond to each other. For similar descriptions, refer to the method embodiment. As shown in FIG. 16, the network device 600 includes a processor 610, a memory 620, and a transceiver 630. The processor 610, the memory 620, and the transceiver 630 are connected. The memory 620 stores instructions. The processor 610 is configured to execute the instructions stored in the memory 620. The transceiver 630, driven by the processor 610, is configured to send or receive a specific signal.

The transceiver 630 is configured to generate configuration information of a control channel resource set, where the configuration information is used to indicate the control channel resource set, and the configuration information includes at least one of a quantity of time-frequency resource blocks of a control channel and an interval between two adjacent time-frequency resource blocks.

The transceiver 630 is configured to send the configuration information.

This embodiment of this application provides the network device. The network device uses the configuration information of the control channel resource set to indicate the time-frequency resource of the control channel. The time-frequency resource of the control channel is inconsecutive and includes a plurality of time-frequency resource blocks, and there is an interval between the plurality of time-frequency resource blocks. Therefore, even if a relatively large quantity of signal paths are generated in a channel environment, a terminal device may obtain a better frequency diversity gain when receiving the control information on the control channel, to improve transmission efficiency.

The components in the network device 600 are connected. To be specific, the processor 610, the memory 620, and the transceiver 630 communicate with each other through an inner connection path, to transmit a control signal and/or a data signal. It should be noted that the foregoing method embodiments in this application may be applied to the processor, or the processor implements the steps in the foregoing method embodiments. The processor may be an integrated circuit chip and has a signal processing capability. In an implementation process, the steps in the foregoing method embodiments can be implemented by using a hardware integrated logical circuit in the processor, or by using instructions in a form of software. The processor may be a central processing unit CPU, an NP, a combination of a CPU and an NP, a DSP, an ASIC, an FPGA or another programmable logic device, a discrete gate or a transistor logic device, or a discrete hardware component. The processor may implement or perform the methods, steps, and logical block diagrams that are disclosed in this application. The general-purpose processor may be a microprocessor, or the processor may be any conventional processor or the like. The steps of the methods disclosed with reference to this application may be directly executed and accomplished by a hardware decoding processor, or be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the steps in the foregoing methods in combination with hardware of the processor.

Optionally, in another embodiment of this application, the time-frequency resource block includes at least one resource element group REG set, and the REG set includes a plurality of REGs that are consecutive or adjacent in time domain or in frequency domain.

Optionally, in another embodiment of this application, the interval between two adjacent time-frequency resource blocks includes, in frequency domain, a frequency domain resource corresponding to an integer quantity of REGs or a frequency domain resource corresponding to an integer quantity of REG sets.

Optionally, in another embodiment of this application, offset that is of a frequency domain center location of the resource set and that is relative to a frequency domain center location of a synchronization signal block is predefined, or is indicated by the configuration information; and the synchronization signal block includes the configuration information.

Optionally, in another embodiment of this application, at least one of the quantity of time-frequency resource blocks and the interval between two adjacent time-frequency resource blocks is predefined.

Optionally, in another embodiment of this application, at least one of a quantity of REG sets included in the time-frequency resource block and a quantity of REGs included in the REG set is predefined, or is indicated by the configuration information.

In the network device provided in this embodiment of this application, the provided control channel is inconsecutive in an entire frequency domain, and has a frequency domain interval. The network device sends the control information on the control channel of this format, and may also obtain a better frequency diversity gain, to improve transmission efficiency. However, frequency domain center locations of control channels of different cells have different offsets relative to the frequency domain center location of the control channel resource set, to be specific, control channels of different cells do not overlap in frequency domain, to reduce interference suffered by the different cells from neighboring cells when control information is received on the respective control channels in the different cells. In addition, the configuration information of the control channel resource set is used to indicate the time-frequency resource of the control channel, to resolve a problem that the time-frequency resource of the control channel cannot be indicated in 5G.

Figure 17:
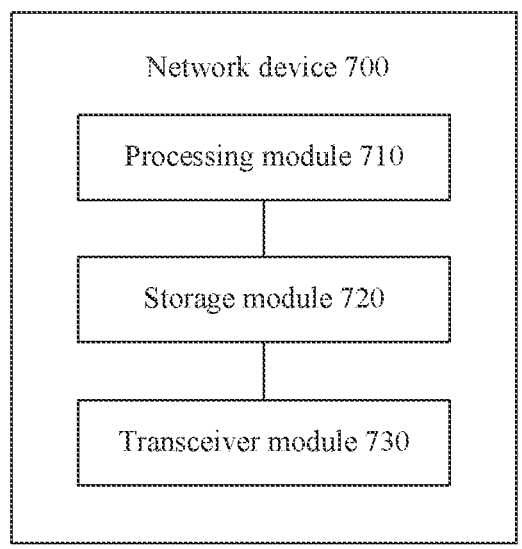
FIG. 17 is a schematic block diagram of a network device according to another embodiment of this application.

It should be noted that, in this embodiment of the present invention, the processor 610 may be implemented by a processing module, the memory 620 may be implemented by a storage module, and the transceiver 630 may be implemented by a transceiver module. As shown in FIG. 17, a network device 700 may include a processing module 710, a storage module 720, and a transceiver module 730.

The network device 600 shown in FIG. 16 or the network device 700 shown in FIG. 17 can implement the steps performed by the network device in FIG. 13. To avoid repetition, details are not described herein again.

An embodiment of this application further provides a computer readable medium, configured to store computer program code. The computer program includes instructions used to execute the information transmission method according to the embodiments of this application in FIG. 4 and FIG. 8. The readable medium may be a read-only memory (read-only memory, ROM) or a random access memory (random access memory, RAM). This is not limited in this embodiment of this application.

An embodiment of this application further provides a communications system. The communications system includes the terminal device provided in the foregoing embodiments of this application and the network device provided in the foregoing embodiments of this application. The communications system may implement any information transmission method provided in the embodiments of this application.

It should be understood that the terms "and/or" and "at least one of A or B" in this specification describe only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving configuration information of a control channel resource set, wherein the configuration information indicates a quantity of time-frequency resource blocks of the control channel resource set and an offset from a frequency domain center location of a synchronization signal block to a frequency domain center location of the control channel resource set, wherein the synchronization signal block includes broadcast information and a synchronization and wherein the broadcast information includes the configuration information;
   determining the control channel resource set based on the quantity of time-frequency resource blocks and the offset; and
   receiving control information within the control channel resource set.

2. The method according to claim 1, wherein the time-frequency resource block comprises six consecutive resource element groups (REGs) in frequency domain, and wherein each of the six REGs occupies 12 consecutive subcarriers in frequency domain.

3. The method according to claim 2, wherein an interval between two adjacent time-frequency resource blocks is a frequency domain resource corresponding to an integer quantity of REGs or REG sets.

4. The method according to claim 2, wherein a frequency domain size of the REG set is two REGs, three REGs, or six REGs that are consecutive or adjacent in frequency domain.

5. The method according to claim 2, wherein a time domain size of the REG set is one REG, two REGs, or three REGs that are consecutive or adjacent in time domain.

6. The method according to claim 2, wherein a quantity of REGs comprised in the REG set is predefined.

7. The method according to claim 1, wherein the time-frequency resource block comprises at least one resource element group (REG) set, wherein the REG set comprises a plurality of REGs that are consecutive or adjacent at least one of in time domain or in frequency domain, and wherein each of the plurality of REGs occupies 12 consecutive subcarriers in frequency domain and occupies one orthogonal frequency division multiplexing (OFDM) symbol length in time domain.

8. An apparatus, comprising at least one processor and a memory coupled to the at least one processor and storing programming instructions for execution by the at least one processor to cause the apparatus to perform operations comprising:
   receiving configuration information of a control channel resource set, wherein the configuration information indicates a quantity of time-frequency resource blocks of the control channel resource set and an offset from a frequency domain center location of a synchronization signal block to a frequency domain center location of the control channel resource set, wherein the synchronization signal block includes broadcast information and a synchronization signal, and wherein the broadcast information includes the configuration information;
   determining the control channel resource set based on the quantity of time-frequency resource blocks and the offset; and
   receiving control information within the control channel resource set.

9. The apparatus according to claim 8, wherein the time-frequency resource block comprises six consecutive resource element groups (REGs) in frequency domain, and wherein each of the six REGs occupies 12 consecutive subcarriers in frequency domain.

10. The apparatus according to claim 9, wherein an interval between two adjacent time-frequency resource blocks is a frequency domain resource corresponding to an integer quantity of REGs or REG sets in frequency domain.

11. The apparatus according to claim 9, wherein a frequency domain size of the REG set is two REGs, three REGs, or six REGs that are consecutive or adjacent in frequency domain.

12. The apparatus according to claim 9, wherein a time domain size of the REG set is one REG, two REGs, or three REGs that are consecutive or adjacent in time domain.

13. The apparatus according to claim 9, wherein a quantity of REGs comprised in the REG set is predefined.

14. The apparatus according to claim 8, wherein the time-frequency resource block comprises at least one resource element group (REG) set, wherein the REG set comprises a plurality of REGs that are consecutive or adjacent at least one of in time domain or in frequency domain, and wherein each of the plurality of REGs occupies 12 consecutive subcarriers in frequency domain and occupies one orthogonal frequency division multiplexing (OFDM) symbol length in time domain.

15. A method, comprising:
    determining a control channel resource set based on a quantity of time-frequency resource blocks of the control channel resource set and an offset from a frequency domain center location of a synchronization signal block to a frequency domain center location of the control channel resource set;
    sending configuration information of the control channel resource set, wherein the configuration information indicates the quantity of time-frequency resource blocks of the control channel resource set and the offset, wherein the synchronization signal block includes broadcast information and a synchronization signal, and wherein the broadcast information includes the configuration information; and sending control information within the control channel resource set.

16. The method according to claim 15, wherein the time-frequency resource block comprises six consecutive resource element groups (REGs) in frequency domain, and wherein each of the six REGs occupies 12 consecutive subcarriers in frequency domain.

17. The method according to claim 16, wherein an interval between two adjacent time-frequency resource blocks is a frequency domain resource corresponding to an integer quantity of REGs or REG sets.

18. The method according to claim 16, wherein a frequency domain size of the REG set is two REGs, three REGs, or six REGs that are consecutive or adjacent in frequency domain.

19. The method according to claim 16, wherein a time domain size of the REG set is one REG, two REGs, or three REGs that are consecutive or adjacent in time domain.

20. The method according to claim 15, wherein the time-frequency resource block comprises at least one resource element group (REG) set, wherein the REG set comprises a plurality of REGs that are consecutive or adjacent at least one of in time domain or in frequency domain, and wherein each of the plurality of REGs occupies 12 consecutive subcarriers in frequency domain and occupies one orthogonal frequency division multiplexing (OFDM) symbol length in time domain.

* * * * *

UNITED STATES PATENT AND TRADEMARK OFFICE
CERTIFICATE OF CORRECTION

PATENT NO. : 11,700,101 B2
APPLICATION NO. : 17/876248
DATED : July 11, 2023
INVENTOR(S) : Jianguo Wang et al.

It is certified that error appears in the above-identified patent and that said Letters Patent is hereby corrected as shown below:

In the Claims

In Column 27, In Line 39, In Claim 1, after "synchronization" insert -- signal, --.

Signed and Sealed this
Seventeenth Day of October, 2023

Katherine Kelly Vidal
*Director of the United States Patent and Trademark Office*